(12) United States Patent
Xian et al.

(10) Patent No.: US 11,947,416 B2
(45) Date of Patent: Apr. 2, 2024

(54) FAULT DIAGNOSIS IN COMPLEX SYSTEMS

(71) Applicant: INTERNATIONAL BUSINESS MACHINES CORPORATION, Armonk, NY (US)

(72) Inventors: Wei Xian, Xi'an (CN); Gang Lyu, Shanghai (CN); Dong Ping Song, Xi'an (CN); Geng Hu, Xi'an (CN); Yao Dong Zhang, Shanghai (CN); Ke Qiang Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/644,227

(22) Filed: Dec. 14, 2021

(65) Prior Publication Data

US 2023/0185653 A1 Jun. 15, 2023

(51) Int. Cl.
*G06F 11/36* (2006.01)
*G06F 11/07* (2006.01)
*G06Q 10/0633* (2023.01)

(52) U.S. Cl.
CPC ........ *G06F 11/079* (2013.01); *G06F 11/0751* (2013.01); *G06F 11/0778* (2013.01); *G06F 11/3612* (2013.01); *G06F 11/3616* (2013.01); *G06F 11/3692* (2013.01); *G06Q 10/0633* (2013.01)

(58) Field of Classification Search
None
See application file for complete search history.

(56) References Cited

U.S. PATENT DOCUMENTS

| | | | |
|---|---|---|---|
| 7,260,501 B2 | 8/2007 | Pattipatti | |
| 9,177,398 B2 | 11/2015 | Bierweiler | |
| 9,678,850 B1 | 6/2017 | Rickard | |
| 11,231,986 B1 * | 1/2022 | Silakov | G06F 11/079 |
| 11,381,583 B1 * | 7/2022 | Ellis | G06V 10/82 |
| 11,403,157 B1 * | 8/2022 | Ross | G06F 11/3636 |
| 11,526,425 B1 * | 12/2022 | Karis | G06F 11/3452 |

(Continued)

FOREIGN PATENT DOCUMENTS

| | | |
|---|---|---|
| EP | 2587329 B1 | 1/2015 |
| WO | 2003005200 A1 | 1/2003 |

OTHER PUBLICATIONS

Pengpeng Zhou, Yang Wang, Zhenyu Li, Gareth Tyson, Hongtao Guan, Gaogang Xie, "Logchain: Cloud workflow reconstruction & troubleshooting with unstructured logs," Computer Networks, vol. 175, 2020, 107279, ISSN 1389-1286,https://doi.org/10.1016/j.comnet.2020.107279.

(Continued)

*Primary Examiner* — Jason D Mitchell
(74) *Attorney, Agent, or Firm* — Grant Johnson

(57) ABSTRACT

A system and related method identify a weakness of a workflow in a complex system. The method collects runtime data about the complex system. The complex system comprises a plurality of subcomponents, and the method identifies an abnormal operation in the complex system. The method constructs a multi-dimensional cause-and-effect relation matrix among the plurality of subcomponents, and filters one or more related operations using the multi-dimensional cause-and-effect relation matrix.

13 Claims, 10 Drawing Sheets

(56) References Cited

U.S. PATENT DOCUMENTS

| | | | |
|---|---|---|---|
| 2015/0269013 A1* | 9/2015 | Hofig | G06Q 10/101 |
| | | | 714/37 |
| 2015/0286495 A1 | 10/2015 | Lee | |
| 2018/0225584 A1 | 8/2018 | Brown | |
| 2019/0108084 A1* | 4/2019 | Hipp | G06Q 10/0635 |
| 2020/0042426 A1* | 2/2020 | Ambichl | G06F 11/3452 |
| 2021/0294683 A1* | 9/2021 | Fujita | G06N 5/045 |
| 2022/0027249 A1* | 1/2022 | Dua | G06F 11/3466 |
| 2022/0114040 A1* | 4/2022 | Kumar | G06F 11/0787 |

OTHER PUBLICATIONS

Troubleshooting and debugging, Google Cloud, Dataflow-Documentation-Guides, https://cloud.google.com/dataflow/docs/guides/troubleshooting-your-pipeline.

* cited by examiner

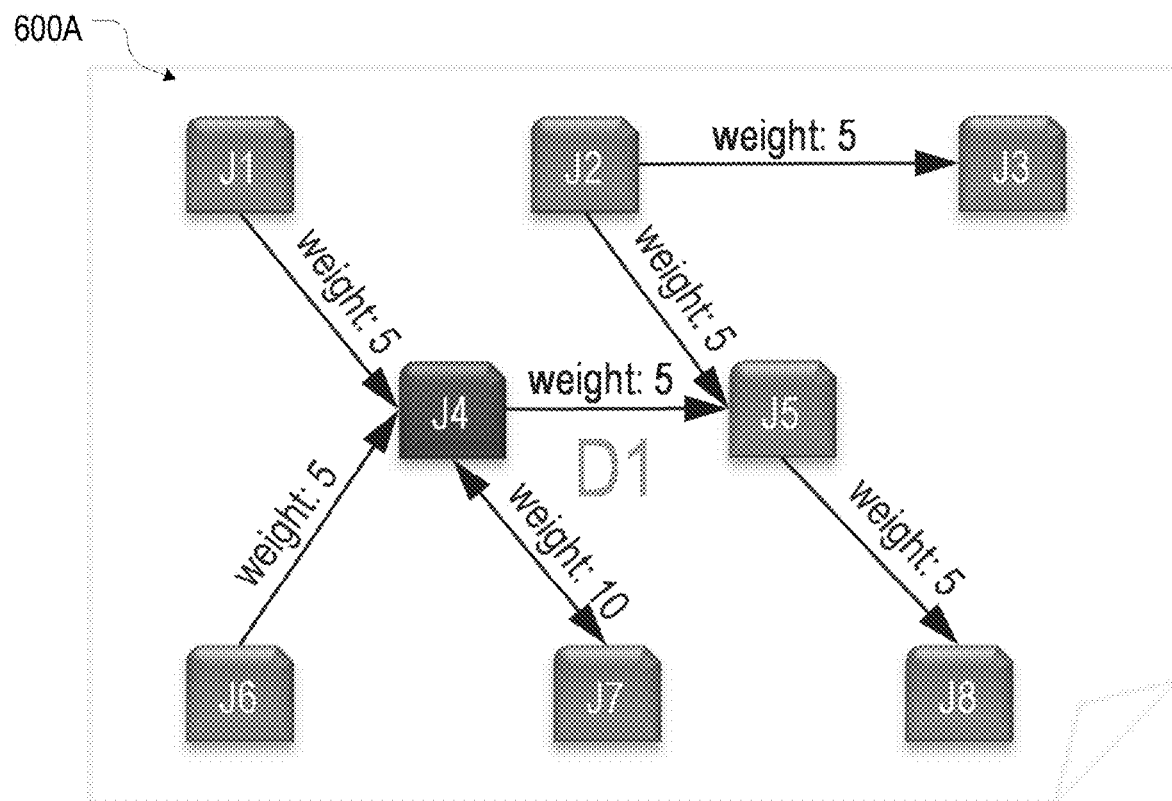
FIG 6A weight in topology dimension
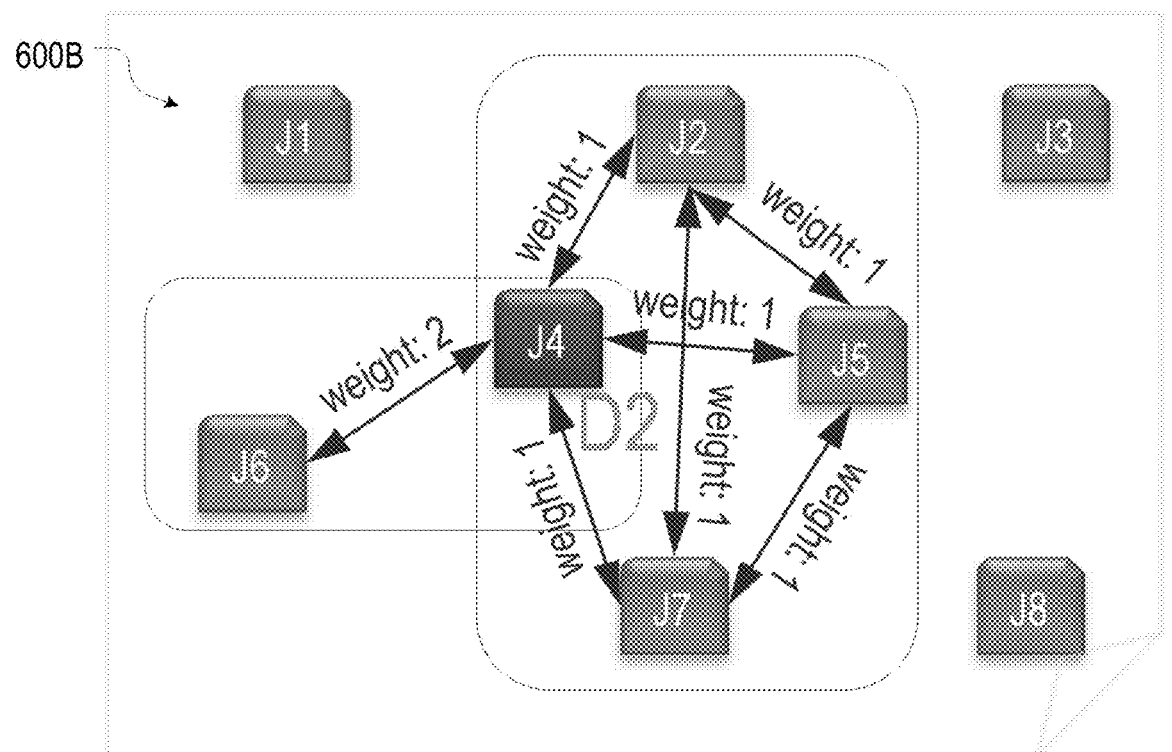
FIG. 6B. weight in metadata usage dimension

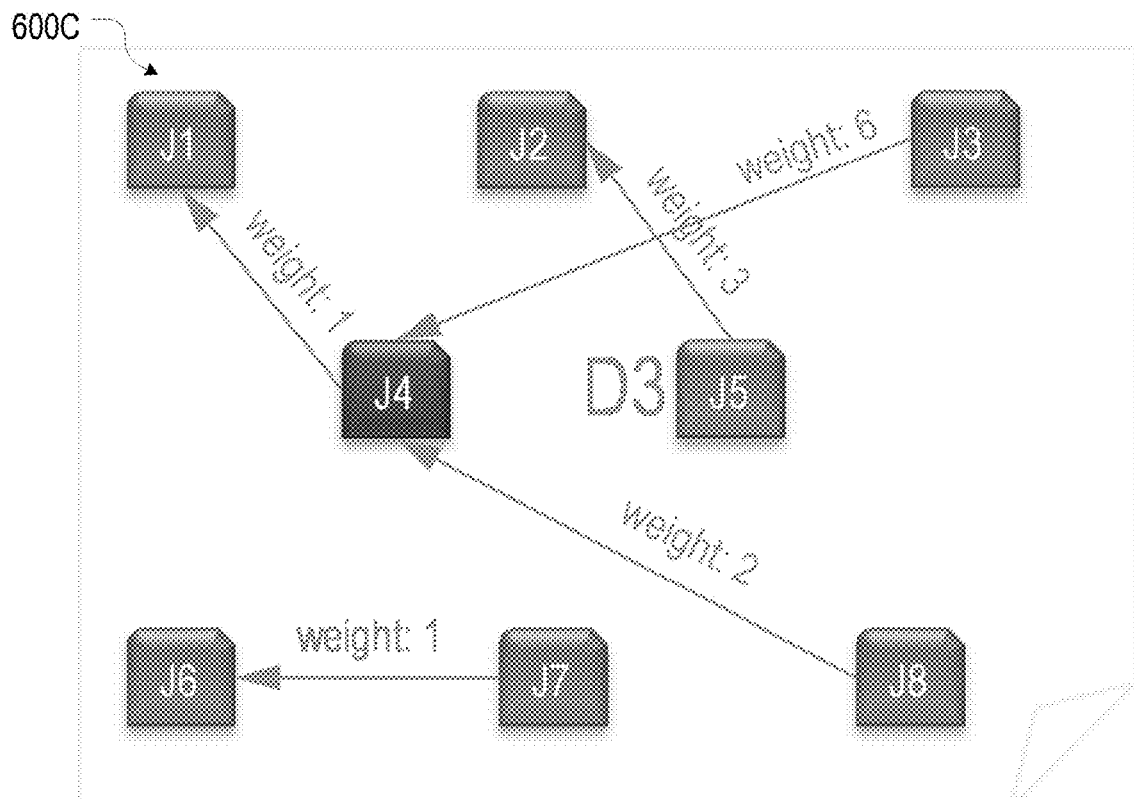
FIG. 6C weight in calling frequency dimension
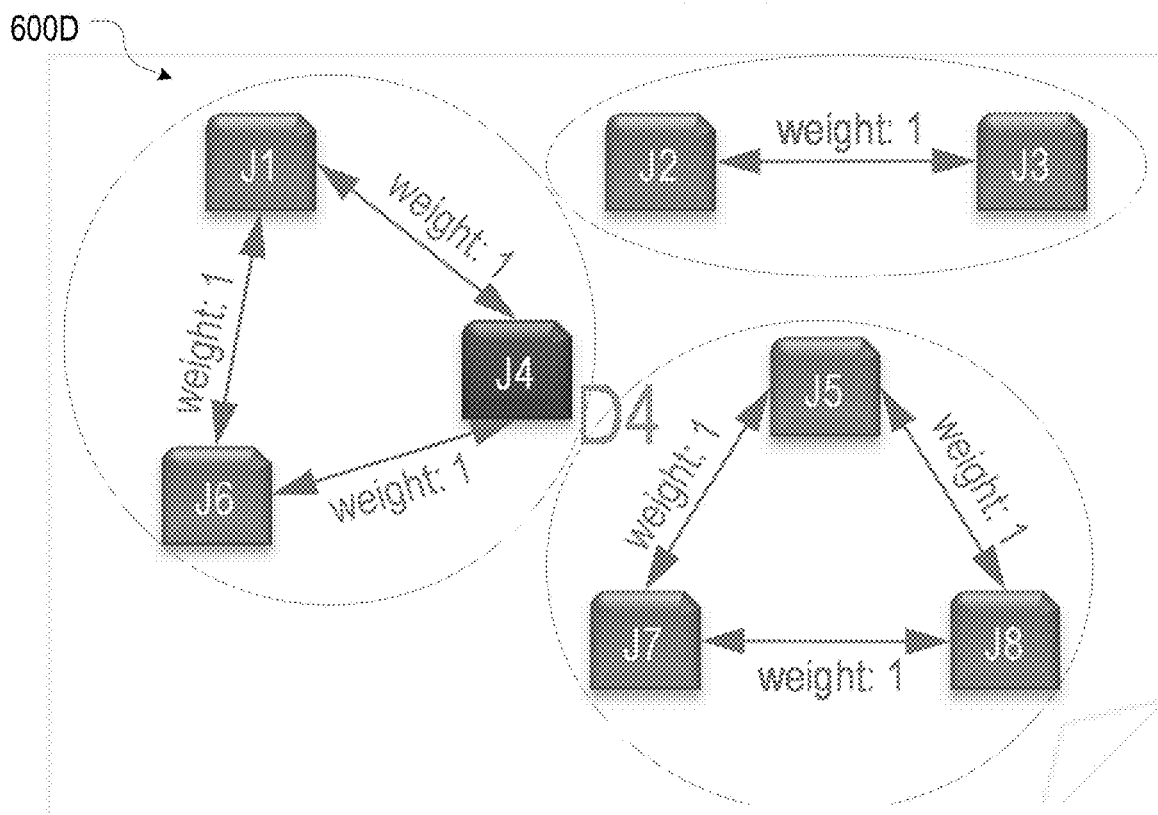
FIG. 6D weight in resource occupation dimension

|  | J1 | J2 | J3 | J4 | J5 | J6 | J7 | J8 |
|---|---|---|---|---|---|---|---|---|
| J8 | D1(T): W0 D2(M): W0 D3(C): W0 D4(R): W0 | D1(T): W0 D2(M): W0 D3(C): W0 D4(R): W0 | D1(T): W0 D2(M): W0 D3(C): W0 D4(R): W0 | D1(T): W0 D2(M): W0 D3(C): W0 D4(R): W0 | D1(T): W5 D2(M): W0 D3(C): W0 D4(R): W0 | D1(T): W0 D2(M): W0 D3(C): W0 D4(R): W0 | D1(T): W0 D2(M): W0 D3(C): W0 D4(R): W1 | |
| J7 | D1(T): W0 D2(M): W0 D3(C): W0 D4(R): W0 | D1(T): W0 D2(M): W1 D3(C): W0 D4(R): W0 | D1(T): W0 D2(M): W0 D3(C): W0 D4(R): W0 | D1(T): W10 D2(M): W1 D3(C): W0 D4(R): W0 | D1(T): W0 D2(M): W1 D3(C): W0 D4(R): W1 | D1(T): W0 D2(M): W0 D3(C): W0 D4(R): W0 | | D1(T): W0 D2(M): W0 D3(C): W0 D4(R): W1 |
| J6 | D1(T): W0 D2(M): W0 D3(C): W0 D4(R): W1 | D1(T): W0 D2(M): W0 D3(C): W0 D4(R): W0 | D1(T): W0 D2(M): W0 D3(C): W0 D4(R): W0 | D1(T): W0 D2(M): W2 D3(C): W0 D4(R): W1 | D1(T): W0 D2(M): W0 D3(C): W0 D4(R): W0 | | D1(T): W0 D2(M): W0 D3(C): W1 D4(R): W0 | D1(T): W0 D2(M): W0 D3(C): W0 D4(R): W0 |
| J5 | D1(T): W0 D2(M): W0 D3(C): W0 D4(R): W0 | D1(T): W5 D2(M): W1 D3(C): W0 D4(R): W0 | D1(T): W0 D2(M): W0 D3(C): W0 D4(R): W0 | D1(T): W5 D2(M): W1 D3(C): W0 D4(R): W0 | | D1(T): W0 D2(M): W0 D3(C): W0 D4(R): W0 | D1(T): W0 D2(M): W1 D3(C): W0 D4(R): W1 | D1(T): W0 D2(M): W0 D3(C): W0 D4(R): W1 |
| J4 | D1(T): W5 D2(M): W0 D3(C): W0 D4(R): W1 | D1(T): W0 D2(M): W1 D3(C): W0 D4(R): W0 | D1(T): W0 D2(M): W0 D3(C): W6 D4(R): W0 | | D1(T): W0 D2(M): W1 D3(C): W0 D4(R): W0 | D1(T): W5 D2(M): W2 D3(C): W0 D4(R): W1 | D1(T): W10 D2(M): W1 D3(C): W0 D4(R): W0 | D1(T): W0 D2(M): W0 D3(C): W2 D4(R): W0 |
| J3 | D1(T): W0 D2(M): W0 D3(C): W0 D4(R): W0 | D1(T): W5 D2(M): W0 D3(C): W0 D4(R): W1 | | D1(T): W0 D2(M): W0 D3(C): W0 D4(R): W0 | D1(T): W0 D2(M): W0 D3(C): W0 D4(R): W0 | D1(T): W0 D2(M): W0 D3(C): W0 D4(R): W0 | D1(T): W0 D2(M): W0 D3(C): W0 D4(R): W0 | D1(T): W0 D2(M): W0 D3(C): W0 D4(R): W0 |
| J2 | D1(T): W0 D2(M): W0 D3(C): W0 D4(R): W0 | | D1(T): W0 D2(M): W0 D3(C): W0 D4(R): W1 | D1(T): W0 D2(M): W1 D3(C): W0 D4(R): W0 | D1(T): W0 D2(M): W1 D3(C): W3 D4(R): W0 | D1(T): W0 D2(M): W0 D3(C): W0 D4(R): W0 | D1(T): W0 D2(M): W1 D3(C): W0 D4(R): W0 | D1(T): W0 D2(M): W0 D3(C): W0 D4(R): W0 |
| J1 | | D1(T): W0 D2(M): W0 D3(C): W0 D4(R): W0 | D1(T): W0 D2(M): W0 D3(C): W1 D4(R): W1 | D1(T): W0 D2(M): W0 D3(C): W0 D4(R): W0 | D1(T): W0 D2(M): W0 D3(C): W0 D4(R): W1 | D1(T): W0 D2(M): W0 D3(C): W0 D4(R): W0 | D1(T): W0 D2(M): W0 D3(C): W0 D4(R): W0 | D1(T): W0 D2(M): W0 D3(C): W0 D4(R): W0 |

FIG. 6F

| | | | | | | | | |
|---|---|---|---|---|---|---|---|---|
| J8 | 0 | 0 | 0 | 0 | 6 | 0 | 1 | |
| J7 | 0 | 1 | 0 | 11 | 2 | 0 | | 1 |
| J6 | 1 | 0 | 0 | 3 | 0 | | 1 | 0 |
| J5 | 0 | 6 | 0 | 6 | | 0 | 2 | 1 |
| J4 | 6 | 1 | 6 | | 1 | 8 | 11 | 2 |
| J3 | 0 | 6 | | 0 | 0 | 0 | 0 | 0 |
| J2 | 0 | | 1 | 1 | 4 | 0 | 1 | 0 |
| J1 | | 0 | 0 | 2 | 0 | 1 | 0 | 0 |
| | J1 | J2 | J3 | J4 | J5 | J6 | J7 | J8 |

— 690 (highlighting row J3)

FIG. 6G Pipeline inner relation weight matix

FAULT DIAGNOSIS IN COMPLEX SYSTEMS

BACKGROUND

The present disclosure relates to fault diagnosis, and more particularly to tools for diagnosing faults in complex systems.

A complex system generally refers to a system comprising many components and/or operations that interact with each other in a variety of different ways. The dependencies, competitions, relationships, or other types of interactions between those components and/or operations, and/or between a given complex system and its environment, make such systems difficult to design, debug, optimize, and maintain. Examples of complex systems include distributed job scheduling, design/manufacturing from model to production, and next generation sequencing.

A pipeline is a type of complex system commonly used in computer systems in which one or more coupled components process and/or analyze data. Each pipeline component may comprise a computer program executing on a data processing system (DPS) that receives data from a source, processes or transforms that data, and forwards the data to another program, computer, or system. Such pipelines can be particularly fragile, as any issue encountered at one pipeline component can cause the other pipeline components to fail.

While systems continue to grow in size and complexity, business demands continue to push toward shorter development cycles. Testing and identifying problem areas related to a product may occur at different points in a development process. For example, a typical software development process may include a high level requirements/design review, a detailed requirements/design review, code inspection, unit test, system test, system integration test, potentially a performance test, and typically, a user acceptance test. As the software development process proceeds through this process, costs for detecting and remedying defects generally increases, often exponentially. As such, many product developers may seek to detect and remedy defects early in the product development process.

SUMMARY

According to embodiments of the present disclosure, a method is provided for identifying a weakness of a workflow in a complex system, comprising collecting runtime data about the complex system, the complex system comprising a plurality of subcomponents, identifying an abnormal operation in the complex system, constructing a multi-dimensional cause-and-effect relation matrix among the plurality of subcomponents, and filtering one or more related operations using the multi-dimensional cause-and-effect relation matrix.

A system having a memory and processor for implementing the method described above is also provided. Further, a computer readable media is provided that contains instructions that, when executed on a processor, provide an execution of the method operations described above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 6A-6D are a series of relationship diagrams of an illustrative example of a method in operation.

FIG. 6F is a table illustrating a resulting multi-dimensional inference matrix based on the dimensions in FIGS. 6A-6D and the quantification criteria in FIG. 6E.

FIG. 6G is a table illustrating a pipeline inner relation weight matrix used to calculate MLRP.

Figure 1:
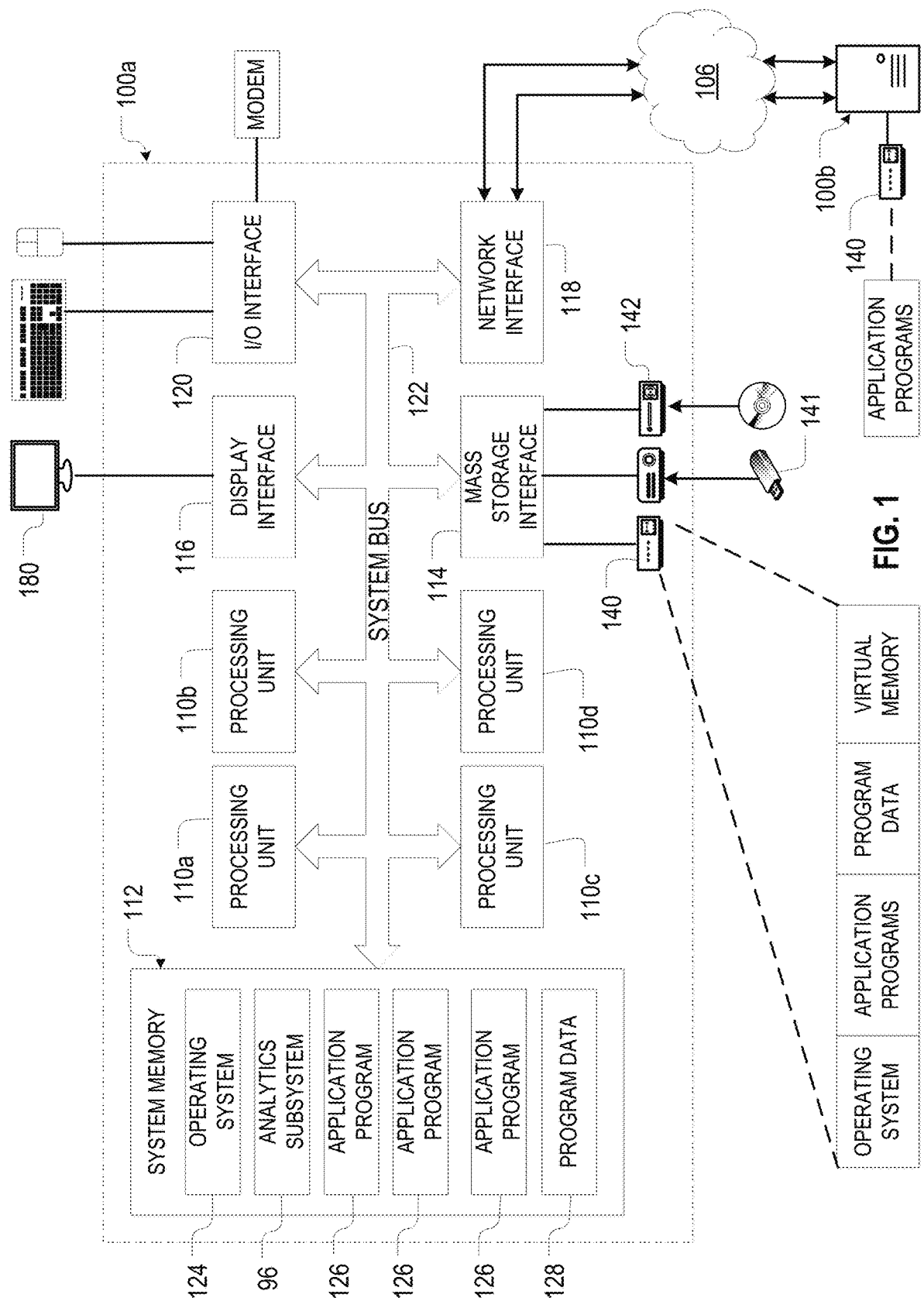
FIG. 1 illustrates one embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to fault diagnosis; more particular aspects relate to tools for diagnosing faults in complex systems. While the present disclosure is not necessarily limited to such applications, various aspects of the disclosure may be appreciated through a discussion of various examples using this context.

Complex systems are notoriously difficult to design, debug, and maintain due to the myriad dependencies, competitions, relationships, and other types of interactions between their constituent components. For example, in many data processing pipelines, once an operation has been executed and generated (with flawed results), the later operations will run with non-optimized inputs, or worse, any future processing will just be wasting resources. Commonly, developers and engineers have to spend huge iterative efforts collecting and triaging from those flawed intermediate results, which may only have small deviation but can influence the final outcome significantly. This can be a particular problem when workflows/pipelines have been highly optimized, and the sampled intermediate results have noise.

As a specific example, parallel handling strategies are a focal point in many high-performance computing (HPC) systems. Many parallel handling strategies divide tasks into a series of operations/jobs, which are typically defined as specific steps/data with elaborated conditions/topologies. Due to ever-increasing requirements for automated disposing, the pre- and post-handling residing at both ends of each operation/job may be time and dependency sensitive. The importance of handling not only a forward operation/job and a backward operation/job, but also back-and-forth among different operation/jobs, may be among the most complex systems ever produced.

Accordingly, some embodiments of this disclosure may construct a cause-and-effect matrix comprising customized multi-dimensions among the workflow operations/jobs, so a most likely trouble area can be identified effectively. Some embodiments may be adapted to measure runtime meta of a workflow, and further, to discover possible weaknesses of the workflow pattern. If an operation/job that becomes abnormal, the related operation/job may be filtered from the multi-dimension relation matrix on each critical timestamp so that the investigation scope may be narrowed down with more details at that timestamp. Some embodiments may further include a result feedback mechanism. In these embodiments, a dimension may be added, adjusted, and/or deleted easily based on the characteristic of workflow. Additionally, a weight for each operation/job may be adjusted per dimension, which may then be used to generate/regenerate a Most Likely Related Path (MLRP) with new weights.

MLRP may provide quantitative criteria to describe how workflow operations/jobs affect each other, which may help engineers and developers to more effectively locate which subcomponents of a complex system are causing abnormal behavior (e.g., software errors, system crashes, incorrect results, slow processing, etc.) In some embodiments, MLRP comprises a series "most likely to be malfunctioning" operations/jobs, which may be used to locate troubles (e.g., filter out unlikely candidates) more effectively. In some embodiments MLRP may be calculated as a weighted sum of interactions between different subcomponents in the complex system. Some embodiments may build a comprehensive quantification matrix, which shows all weights of all related steps/jobs with each other. Some embodiments may use a tree search method to get MLRP from this matrix.

Some embodiments may include a result feedback mechanism. The weight for each operation/job can be adjusted per dimension, and the MLRP can be regenerated with the new weight effectively. In operation, if the MLRP score correctly infers the real trouble area, it is suggested to increase the weights for related areas/subcomponents. If the result inferred is not actually related to real trouble area, the new dimension can be added to make the measure matrix be more precise. The more MLRP results referred, the more effective MLRP can be, e.g., to trace problems with fewer iterative relation calculations. In this way, by adjusting the value of weight(s) on each of the dimension(s), the MLRP scores may become an increasingly valuable reference.

Another feature and advantage of some embodiments is that they do not require a pre-determined and/or pre-specified model. Instead, some embodiments may use a data mining algorithm, such as Apriori, FP-Growth, etc., to initially generate the model from operational data. In this way, by introducing continuously optimized quantitative criteria on diversified result impacting factors, unknown interactions between fast changing process and abnormal outcome can be quickly identified. Additionally, some embodiments may be desirable because they have flexibility to adapt with diversified scenarios, as they can fit any procedure with multiple conditions contributing results in conjunction.

One aspect of some embodiments is a method to measure a runtime meta of workflow, and further, to discover weaknesses of a workflow pattern, including a result feedback mechanism. In some embodiments, if there is an operation/job that becomes abnormal, the related operation/job can be filtered from the multi-dimension relation matrix on each identified/critical timestamp. A scope of an investigation may then be narrowed down with more details. In this way, some embodiments may provide a result feedback mechanism to continuously and dynamically improve the efficiency of troubleshooting. Additionally, the weak operation or job of workflow may be managed according to MLRP, which in turn, may be dynamically modified. In this way, some embodiments may filter the weak operation or job and narrow down the scope of analysis.

Turning now to the figures, FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The DPS 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The network interfaces 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Figure 2:
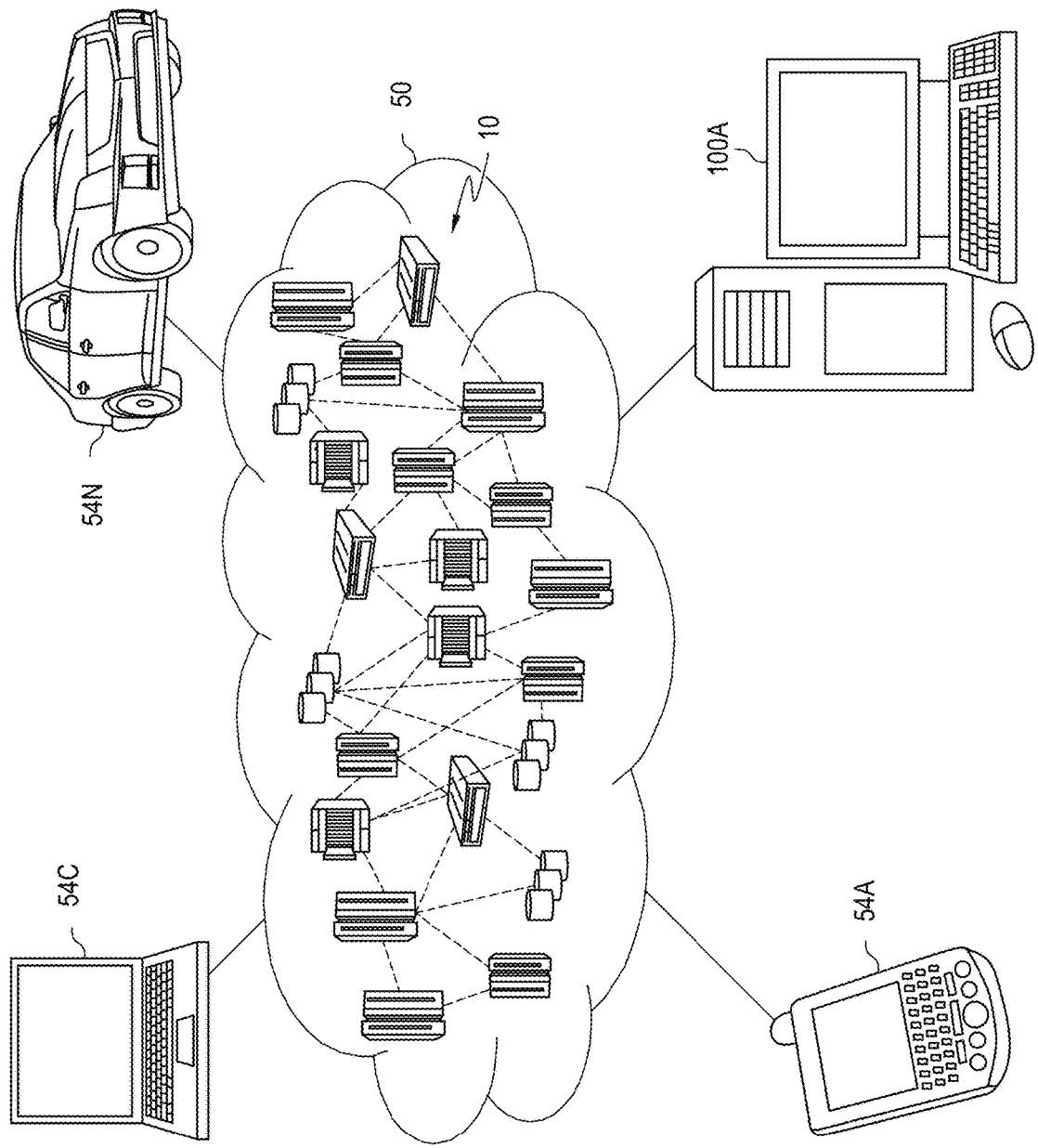
FIG. 2 illustrates one embodiment of a cloud environment suitable for an edge enabled scalable and dynamic transfer learning mechanism.

FIG. 2 illustrates one embodiment of a cloud environment suitable for enabling some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
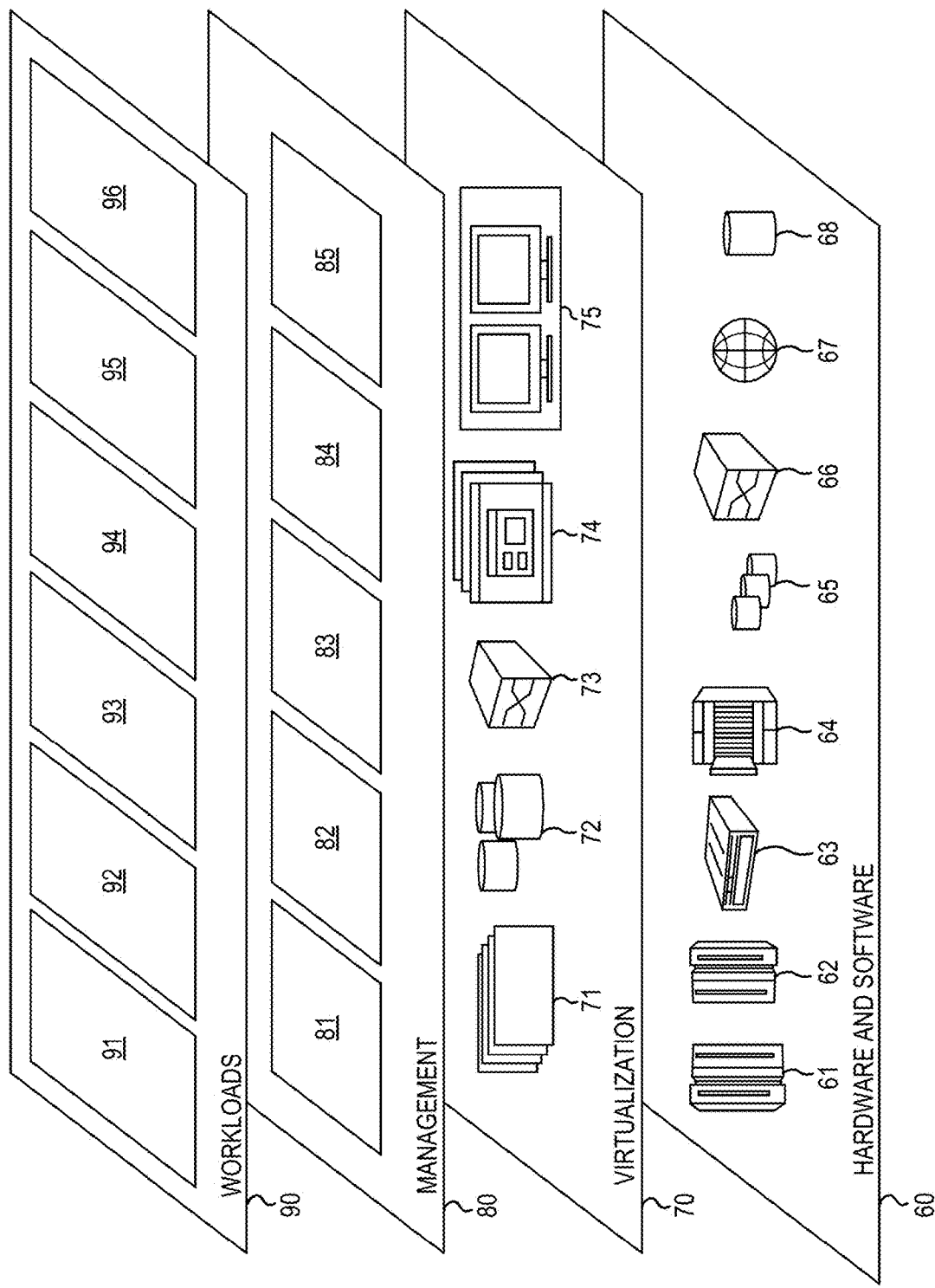
FIG. 3 shows a set of functional abstraction layers provided by a cloud computing environment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an analytics subsystem 96.

Figure 4:
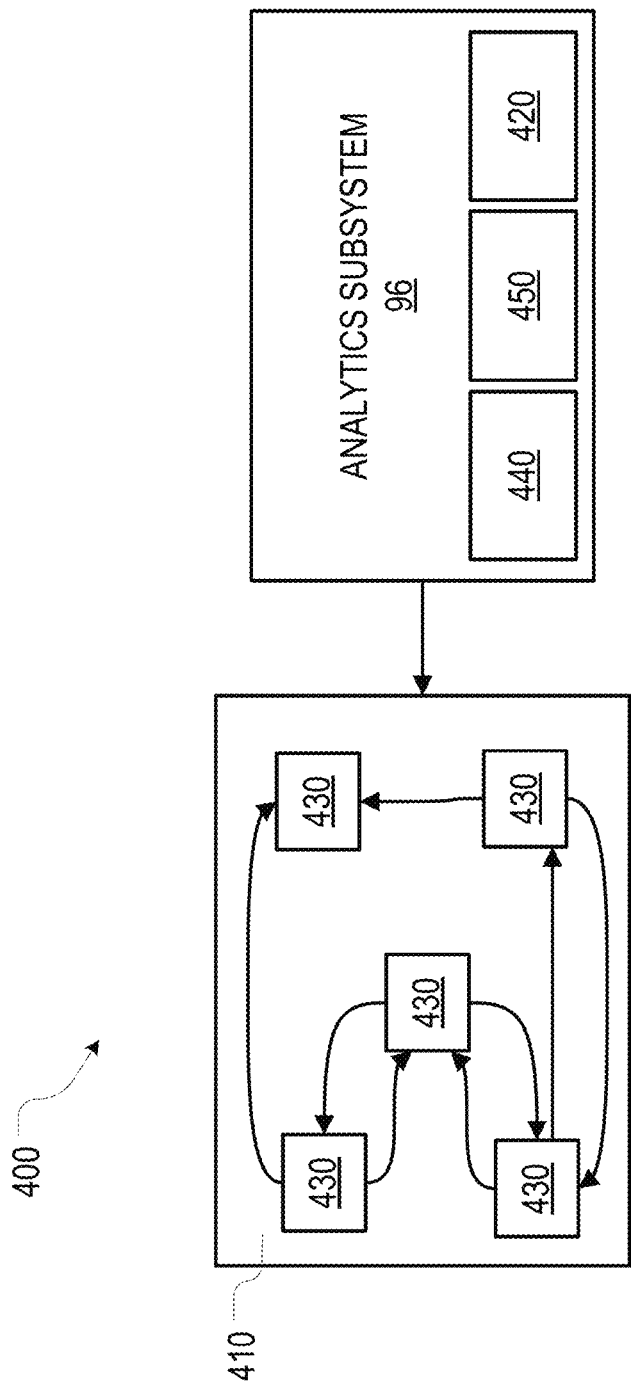
FIG. 4 is a system diagram for an analytics subsystem, consistent with some embodiments.

FIG. 4 is a system diagram 400 for the analytics subsystem 96, consistent with some embodiments. This analytics subsystem 96 may comprise a diagnosis assistant 420 for a complex system 410, such as a data pipeline. The complex system may comprise a plurality of subcomponents 430. The diagnosis assistant 420 may first generate a model 440 of the complex system 410, and then generate a multi-dimensional matrix 450 describing the interactions of the plurality of subcomponents 430.

Figure 5:
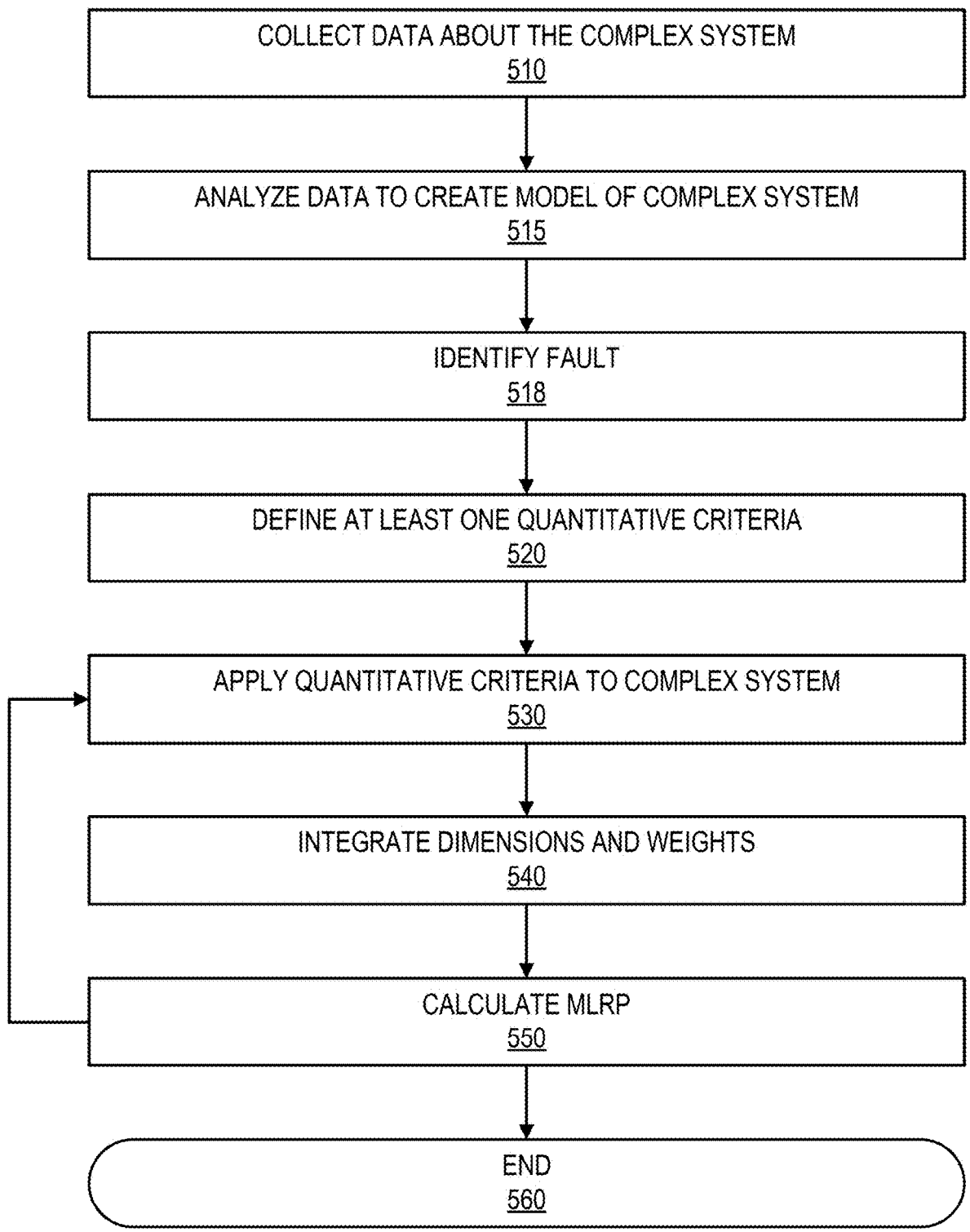
FIG. 5 is a flow chart illustrating one method of diagnosing faults in complex system.

FIG. 5 is a flow chart illustrating one method 500 of diagnosing faults in complex system 410. At operation 510, the diagnosis assistant 420 may collect data about the complex system 410. This data may be analyzed at operation 515 to create a model 440 of the complex system's topology, business logic embedded in any of its components and/or subcomponents, and its operating environment. This operation 515 may include analyzing the data with a data mining algorithm, such as Apriori, FP-Growth, etc.

A fault in the complex system may be identified at operation 518. In response, the diagnosis assistant 420 may define at least one quantitative criteria at operation 520. This may include defining one or more relevant dimensions for the complex system 410. The quantitative criteria may be applied to the complex system 410 at operation 530. This may include assigning and/or measuring a weight for each pair of subcomponents in the complex system 410 for each dimension, resulting in the multidimensional matrix 450. These weights may be indicative of a strength of the relationship between those two subcomponents along that particular dimension. At operation 540, the dimensions and weights may be integrated together into the quantitative criteria.

Next, MLRP may be calculated at operation 550 from the quantitative criteria at a first timestamp of interest (e.g., a first critical timestep within the complex system 410), and used to investigate the fault. MLRP may be the subcomponents for which the quantitative criteria is the greatest with respect to an abnormal subcomponent. If the calculated MLRP is determined to be correct (i.e., the root cause of an abnormal condition was found), the method may end at operation 560. Otherwise, operations 530-550 may be repeated to calculate a next most likely MLRP. This may include increasing/decreasing the weights, adding new dimensions, etc. Operations 530-550 may also be repeated at other timesteps of interest within the complex system 410.

FIGS. 6A-6D are a series of relationship diagrams 600A-600D of an illustrative example of method 500 in operation. This illustrative example is directed at constructing cause-and-effect relations by customized multi dimensions among the pipeline operations/jobs (where jobs J1 to J8 are the subcomponents 430 of the complex system), so the most likely trouble area can be identified effectively. This illustrative example may also measure runtime meta of the pipeline, and further, discover the weaknesses of workflow pattern. If there is an operation/job that becomes abnormal, the related operations/jobs can be filtered from the multi-dimension relation matrix on each critical timestamp so that the investigation scope can be narrowed down with more details. This illustrative example may also include a result feedback mechanism, in which dimension can be added/adjusted/deleted easily based on the characteristic of pipeline. The weight for each step/job also per dimension can be adjusted, and a new MLRP can be regenerated with the new weight(s).

In this example, the quantitative criteria may be defined using the following dimensions:
Dimension 1 (D1): Topology
  J1->J4, J6->J4, J7->J4, J4->J7, J4->J5, J2->J5, J2->J3, J5->J8
  weight defined as: 5 (directly depended), 10 (indirectly depended)
Dimension 2 (D2): Metadata Usage
  Data 1 (used by J2, J4, J7 and J5), Data 2 & 3 (used by J4 and J6)
  weight defined as: 1 (1 shared data), . . . , N (N shared data)
Dimension 3 (D3): Calling Frequency
  J4->J1, J3->J4, J5->J2, J8->J4, J7-J6
  weight defined as: 1 (called 1 times), . . . , N (called N times)
Dimension 4 (D4): Resource Occupation (D2)
  Host 1 (J1, J4, J6), Host 2 (J2, J3), Host 3 (J5, J7, J8)
  weight defined as: 0 (on the same host), 1 (not on the same host)
Dimension n (Dn): parent child, time sequence, etc.

The weights in each dimension may be defined according to experience per historical data, or may be inferred from the results (e.g., the weight may have unlimited proximity to help inferencing more effectively) by a data mining algorithm.

Figure 6E:
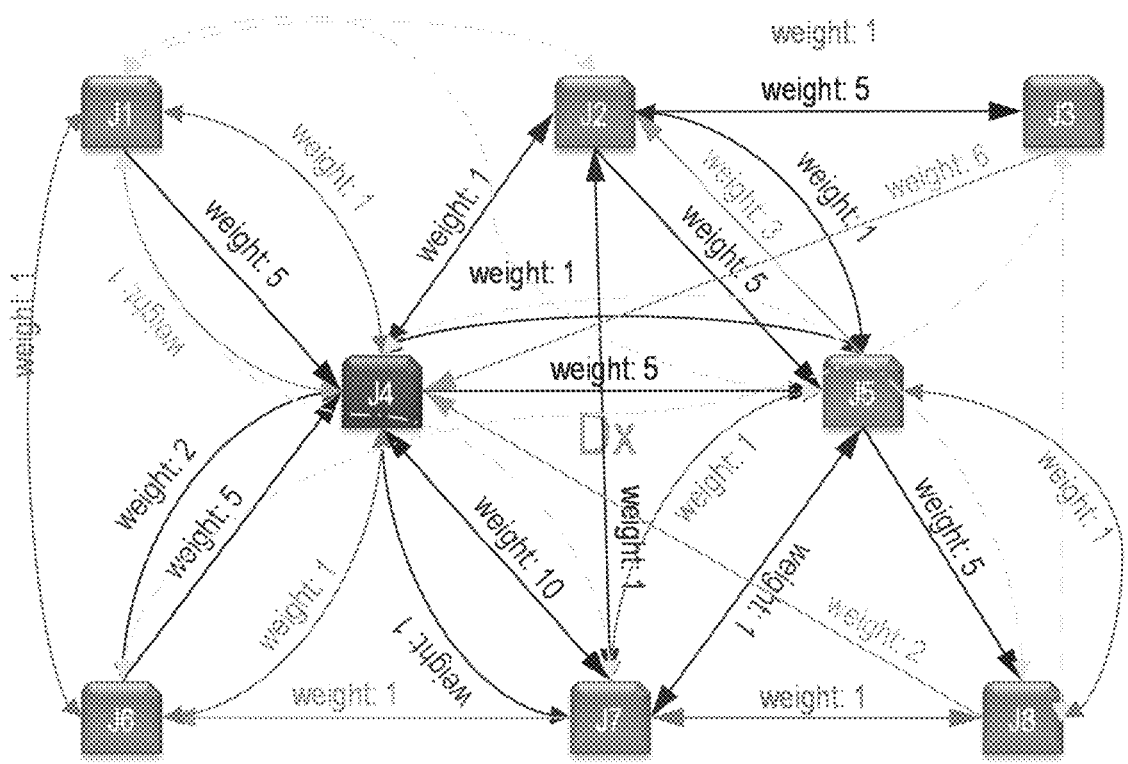
FIG. 6E illustrates an integrated quantification criteria using the dimensions in FIGS. 6A-6D.

FIG. 6E illustrates an integrated quantification criteria using the dimensions in FIGS. 6A-6D. Each dimension may be given its own weight $W_{Dn}$, and a relation strength value may be calculated as:

$$\Sigma(Jx, Jy, Dn) = (W_{xy\_D1} \times W_{D1}) + (W_{xy\_D2} \times W_{D2}) + (W_{xy\_D3} \times W_{D3}) + \ldots + (W_{xy\_Dn} \times W_{Dn})$$

For example, to calculate the relation weight value between two operations/jobs between jobs e.g., J7 to J4, some embodiments may calculate D1 as directly depended (10); D2 as having 1 shared data (1); D3 as called 0 times (0); D4 as not on the same host (0). In this example, each dimension has its own weight $W_{Dn}$. Relation strength between J4 and J7 may be calculated as $56 = (10 \times 5) + (1 \times 6) + (0 \times 3) + (0 \times 2)$.

FIG. 6F is a table illustrating a resulting multi-dimensional inference matrix 650 based on the dimensions in FIGS. 6A-6D and the quantification criteria in FIG. 6E. This multi-dimensional inference matrix may be used calculate the most likely related path (MLRP). When a specific operation/job is determined to be abnormal (e.g. J4 in this illustrative example), the multi-dimensional inference matrix 650 in FIG. 6F shows all related operations/jobs that have a relation with J4 i.e., J1->J4=27, J2->J4=6, J3->J4=18, J4->J4=Max, J5->J4=6, J6->J4=39, J7->J4=56, J8->J4=6, where J4->J4=Max indicates the most possible relationship for J4 is with itself. As best shown in FIG. 6G, to get MLRP 690 in some embodiments, the operation is started by removing the pairs for which its relation weight value is 0, then pairs are ordered by relation weight value, and any abnormal step/job is matrixed with the highest weight in the list. Thus, the final MLRP (for an abnormal J4): J7->J6->J1->J3->J2/J5/J8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a subsystem, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method for identifying a weakness of a workflow in a complex system, comprising:
    collecting runtime data about the complex system, the complex system comprising a plurality of subcomponents;
    identifying an abnormal operation in the complex system;
    constructing a multi-dimensional cause-and-effect relation matrix among the plurality of subcomponents, including assigning weights to each interaction of one of the plurality of subcomponents with respect to other subcomponents of the plurality of subcomponents with respect to each dimension of the multi-dimensional cause-and-effect matrix;
    calculating a Most Likely Related Path (MLRP) score for the abnormal operation using the assigned weights;
    filtering one or more related operations using the calculated MLRP score;
    presenting the filtered one or more operations to a user;
    determining if the MLRP score correctly inferred the real trouble area for the abnormal operation; and
    in response to the determining, adjusting one or more of the assigned weights for one or more of the plurality of dimensions.

2. The method of claim 1, further comprising adjusting one or more of the assigned weights based on a characteristic of the workflow.

3. The method of claim 2, further comprising regenerating the MLRP score with the one or more adjusted weights.

4. The method of claim 1, further comprising repeating the filtering at each of a plurality of timestamps.

5. The method of claim 1, wherein the dimensions of the multi-dimensional cause-and-effect matrix comprise topology, metadata usage, calling frequency, and resource occupation.

6. The method of claim 1, wherein the constructing, the calculating, the determining, and the adjusting are performed in response to identifying the abnormal operation in the complex system.

7. A system for identifying a weakness of a workflow in a complex system, comprising:
    a memory; and
    a processor configured to:
        collect runtime data about the complex system, the complex system comprising a plurality of subcomponents;
        identify an abnormal operation in the complex system;
        construct a multi-dimensional cause-and-effect relation matrix among the plurality of subcomponents, including assigning weights to each interaction of one of the plurality of subcomponents with respect to other subcomponents of the plurality of subcomponents with respect to each dimension of the multi-dimensional cause-and-effect matrix;
        calculate a Most Likely Related Path (MLRP) score for the abnormal operation using the assigned weights;
        filter one or more related operations using the calculated MLRP score;
        present the filtered one or more operations to a user;
        determine if the MLRP score correctly inferred the real trouble area for the abnormal operation; and
        in response to the determining, adjust one or more of the assigned weights for one or more of the plurality of dimensions.

8. The system of claim 7, wherein the processor is further configured to adjust one or more of the assigned weights based on a characteristic of the workflow.

9. The system of claim 8, wherein the processor is further configured to regenerate the MLRP score with the one or more adjusted weights.

10. The system of claim 7, wherein the processor is further configured to repeat the filtering at each of a plurality of timestamps.

11. A computer-readable storage medium comprising instructions for causing at least one programmable processor of a computing device to:
    collect runtime data about the complex system, the complex system comprising a plurality of subcomponents;
    identify an abnormal operation in the complex system;
    construct a multi-dimensional cause-and-effect relation matrix among the plurality of subcomponents, including assigning weights to each interaction of one of the plurality of subcomponents with respect to other subcomponents of the plurality of subcomponents with respect to each dimension of the multi-dimensional cause-and-effect matrix;
    calculate a Most Likely Related Path (MLRP) score for the abnormal operation using the assigned weights;
    filter one or more related operations using the calculated MLRP score;
    present the filtered one or more operations to a user;
    determine if the MLRP score correctly inferred the real trouble area for the abnormal operation; and
    in response to the determining, adjust one or more of the assigned weights for one or more of the plurality of dimensions.

12. The computer readable medium of claim 11, wherein the instructions further cause the processor to:
    adjust one or more of the assigned weights based on a characteristic of the workflow.

13. The computer readable medium of claim 12, wherein the instructions further cause the processor to:
    regenerate the most likely related path with the one or more adjusted weights; and
    repeat the filtering at each of a plurality of timestamps.

* * * * *